United States Patent [19]

Min et al.

[11] Patent Number: 5,157,435
[45] Date of Patent: Oct. 20, 1992

[54] AUTOMATIC FOCUSING APPARATUS FOR A VIDEO CAMERA AND THE METHOD THEREOF

[75] Inventors: Chun-Gi Min, Seoul; Su-yeol Jeong, Euiwang, both of Rep. of Korea

[73] Assignee: Samsung Electronics Co., Ltd., Kyunggi, Rep. of Korea

[21] Appl. No.: 636,714

[22] Filed: Dec. 28, 1990

[30] Foreign Application Priority Data

Sep. 29, 1990 [KR] Rep. of Korea .............. 90-15683[U]

[51] Int. Cl.$^5$ .............................................. G03B 13/36
[52] U.S. Cl. ...................................... 354/403; 356/1; 356/4; 250/201.4; 358/227
[58] Field of Search ................ 354/403; 358/227; 250/201.4; 356/1, 4

[56] References Cited

U.S. PATENT DOCUMENTS

| | | | |
|---|---|---|---|
| 4,796,044 | 1/1989 | Amanuma et al. | 354/403 |
| 4,855,585 | 8/1989 | Nonaka | 354/403 |
| 4,857,717 | 8/1989 | Chino | 354/403 |
| 5,008,695 | 4/1991 | Nagaoka et al. | 354/403 |

Primary Examiner—Russell E. Adams
Attorney, Agent, or Firm—Leydig, Voit & Mayer

[57] ABSTRACT

The present invention relates to an automatic focusing apparatus for a video camera and the method thereof, and particularly to an automatic focusing apparatus for a video camera of an active type using infrared light and the method thereof. The present invention comprises a light emitting part, a light-receiving part, first and second current-voltage converters, a selector, a filter, an amplifying integrator, a comparing part, a microcomputer, a motor driver, and an infrared LED driver. After the infinitesimal currents, which are position detecting signals of both channels supplied to the light-receiving part, are converted to voltage signals in current-voltage converters, the voltage signals are selected in the selector with time-division to be processed in one channel by a filter, an amplifying integrator, and a comparator, so that the hardware amount is decreased. The control signals for driving the infrared LED and the AF motor are converted to a count value and are processed with software, thereby increasing the reliability and the stabilization of the system.

38 Claims, 13 Drawing Sheets

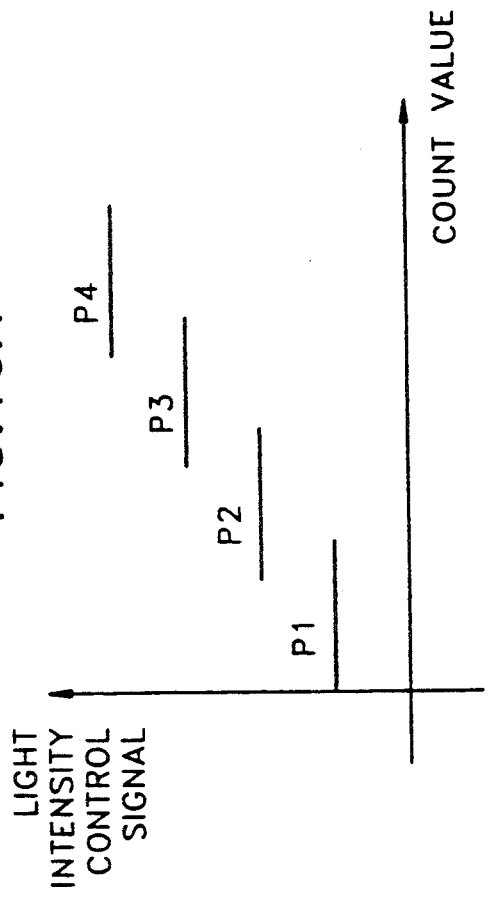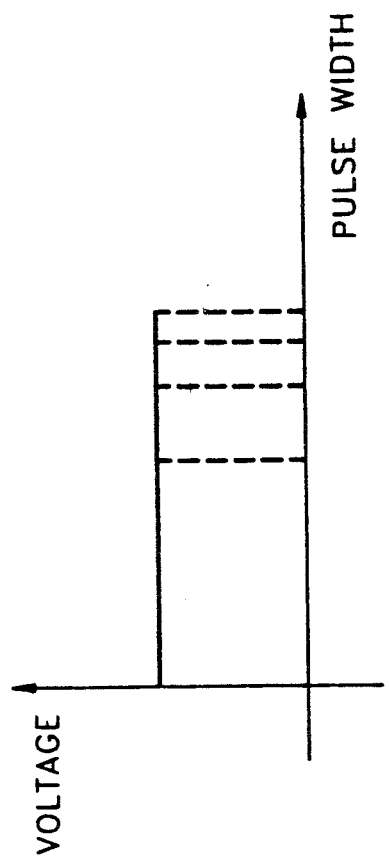

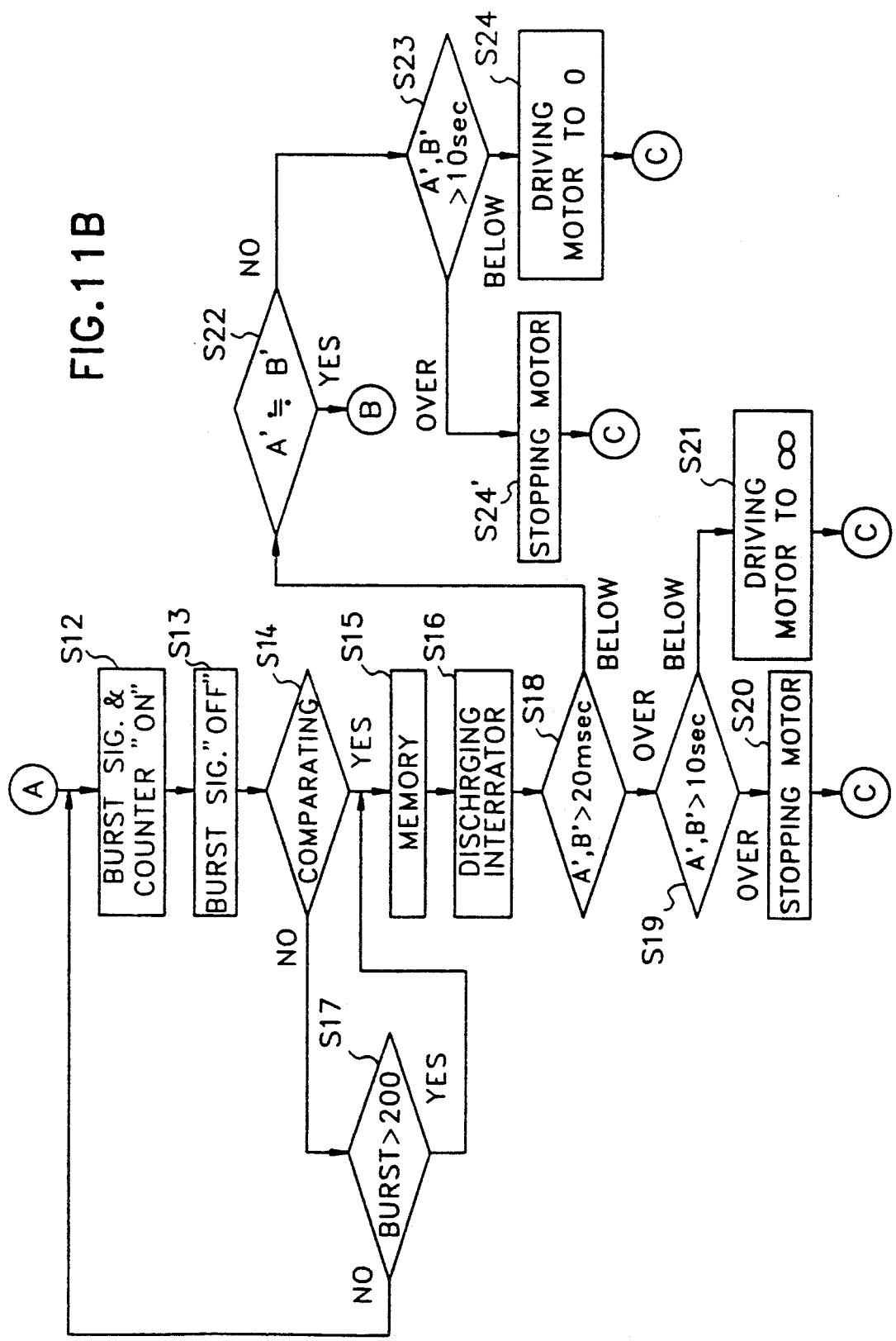

AUTOMATIC FOCUSING APPARATUS FOR A VIDEO CAMERA AND THE METHOD THEREOF

FIELD OF THE INVENTION

The present invention relates to an automatic focusing apparatus for a video camera and the method thereof, and particularly to an automatic focusing apparatus of a video camera and the method thereof which can automatically adjust the focus of a video camera for a moving object.

BACKGROUND OF THE INVENTION

In general, the automatic focusing method of a video camera can be roughly classified into an active type such as an infrared ray distance measuring type or an ultrasonic type, and a passive type such as an image sensing type and an image detecting type.

In particular, the principle of the active type suing an infrared ray distance measuring procedure is shown in FIG. 1, in which infrared rays are projected to an object to obtain the reflected distance measuring signal reflected by the object.

Referring to FIG. 1, the infrared light emitted from the light source of the infrared ray (not shown) such as an infrared light emitting diode (hereinafter, referred to as infrared LED) is reflected on the object 204 through the projecting lens 201, and the reflected light is focused on the light-receiving element 203 through the light-receiving lens 202.

When L indicates the distance from the projecting lens 201 to the object 204, R indicates the distance from the projecting lens 201 to the light-receiving lens 202, F is a focal length of the light-receiving lens 202, and X is the distance from the center of the light-receiving element 203 to the beam of infrared rays entering the light-receiving element 203 through the light-receiving lens 202, the relation between them is as follows:

$$L = R\frac{F}{X}.$$

Since the distance L between the projecting lens 201 and the object 204 is inversely proportional to the distance X between the center of the light-receiving element 203 and the incident point of the reflected light, the distance L can be measured.

Here, the light-receiving element 203 is divided into two channels A and B, and the electrically equivalent circuit thereof is shown in FIG. 2. In the drawings, when the P-sided electrodes are A and B and the N-sided electrode is C with reference to the structure of the light-receiving element. $I_0$ is a total current amount produced proportional to the light incident position $V_0$ is a driving voltage, D1 is an ideal diode, Cj is a junction capacitance, Rsh is a shunt resistor, R1 and R2 indicate resistors from the incident point of the reflected light to the electrodes A and B respectively, S is a current source, and Re is a load resistor.

Here, the photocurrents $I_1$ and $I_2$ can be indicated as the following relation:

$$\frac{I_2 - I_1}{I_2 + I_1} = \frac{Rp}{Rp + R_l} \cdot \frac{2}{L} X. \quad (1)$$

According to the above equation (1), the ratio of $(I_2 - I_1)/(I_2 + I_1)$, which is a ratio of the difference to the sum of the output currents, is proportional to the distance X from the middle point of the electrodes A and B, i.e., from the middle point of the light-receiving element to the incident point of the reflected light. That is, the incident angle or incident point of the beam of reflected infrared rays, which is a distance measuring signal on the light-receiving element, is changed according to the change of the distance between the object and the projecting apparatus.

Here, when the focusing of the object is correct, the reflected light enters the center of the light-receiving element, and the two converted currents $I_1$ and $I_2$ are to be equivalent, so that the value of the equation (1) is zero. When the focusing is diverged, the incident position of the reflected light is focused to be diverged to one side of the light-receiving element, so that the currents $I_1$ and $I_2$ of both channels are different from each other, and the equation (1) has a value other than 0. Accordingly, if the AF motor is controlled to keep the linear relationship between the distance X from the center of the electrodes A and B to the incident point of the reflected light and the ratio of $(I_2-I_1)/(I_2+I_1)$, which is the ratio of the difference to the addition of the output currents, the exact focusing can be achieved.

Referring to FIG. 3, after the infrared light generated from the infrared LED 1 of the light emitting part is projected to the object (not shown), the infrared light is reflected to enter the light-receiving element 2, and is converted to a photocurrent in the two channel electrodes A and B of the light-receiving element 2, and is produced as an infinitesimal current signal. After the infinitesimal current signal is converted to a voltage signal in the first and second pre-amplifiers 3 provided in each channel, the output signals of the first and second pre-amplifiers 3 are filtered and amplified in the first and second synchronous filtering amplifier 4 to be synchronized o the synchronizing signal for turning on/of the infrared LED.

In the first and second buffer amplifiers 5, after the output signals of the first and second synchronous filtering amplifier 4 are integrated, the noise component is removed and the signal level is raised to be output. At this time, when the outputs of the first and second buffer amplifiers 5 are signals A and B respectively, and A/D converter 6 receives the signals A and B, determines one of four cases (i.e., $|A-B| \geq Vd$, $A \geq B$, $A+B \geq Vh$, $A+B \geq Ve$), and generates the determined result to the microcomputer 7. Here, Vd, Vh, and Vl are respectively reference voltages for deciding the width of the responding range, the determining of the focusing, and the speed control range.

In the microcomputer 7, after the traveling direction and the speed or the stopping of the motor M which moves the photographing lens according to the combination of the four signals in the A/D converter 6 are determined, the speed control signal V and direction control signals F and B are supplied to the motor driver 10, and the motor M drives the photographing lens to an optimum focus position, thereby completing the automatic focusing.

Also, the microcomputer 7 supplies the clock signal CLK for making the infrared LED 1 turn on/off and detecting the synchronization of the light-receiving signal to the first and second synchronous filtering amplifiers 4 and the infrared LED driver 9, and the clear signal CLR for clearing the charges of the integration capacitor as a signal for determining the integration interval of the signal produced in the first and second synchronous filtering amplifiers 4, or for controlling the near distance limiter 8 not to control the focus for an object in the near distance, for example within 1 m.

During position detecting, signals of channels A and B produced according to the incident position of the reflected light of the light-receiving element are combined to a control signal in the A/D converter. Driving the AF motor, requires an excessive amount of hardwares, such as pre-amplifiers, synchronous filtering amplifiers, buffer amplifiers, etc., respectively composed of two channels. There also arises another difficulty in that the A/D converter convert should be drived by low bias current and offset voltage as it is composed of an operation amplifier. To improve the problem, the amount of hardware has been increased.

Moreover, since only the levels of both channel signals produced in the light-receiving element are detected and the combination signal in the A/D converter composed of an operation amplifier controls the motor M, there arises a problem in that the focusing of the video camera can not be precisely carried out when the difference of both channel signals is small.

On the other hand, for an object disposed at a near distance or infinity for which the focusing is not needed, an additional near distance limiter 8 is installed or a stopper is provided on the driving part of the photographing lens, so that it results in a complicated constitution of the video camera.

SUMMARY OF THE INVENTION

Therefore, it is an object of the present invention, to provide an automatic focusing apparatus of a video camera having a simple and highly reliable constitution to solve the above problems.

To achieve the above and other objects, an automatic focusing apparatus of a video camera according to the present invention comprises:
- a light emitting part for emitting a light beam to measure a distance;
- a driver for driving the light emitting part;
- a light receiving part composed of two channels, for producing photocurrent signals respectively corresponding to both channels according to an incident point of reflected light which is projected from the light emitting part and is reflected by an object to be photographed;
- first and second current-voltage converting means for converting the photocurrent signals of both channels to amplified voltage signals respectively;
- a selector for selecting output signals of the first and second current-voltage converting means by time division;
- a filter for filtering the selected output signal;
- an amplifying integrator for amplifying and integrating output signals of the detector, and outputting the integrated voltage signal;
- a comparing part for comparing the integrated voltage current with a reference voltage, and outputting a level signal according to the compared result;
- a motor driver for driving a focusing motor; and
- a microcomputer for sequentially receiving level signals corresponding to both channels of the comparing part, comparing the difference of level signals, and then driving the motor driver according to the difference of both level signals until two level signals are equal to each other.

Also, an automatic focusing method using a light emitting part for emitting measuring light beam and a light-receiving part of two channels for detecting a reflected light reflected from an object, comprising the steps of:
- selecting one of the two channels and determining whether a detection signal of the selected channel is set to a predetermined reference voltage;
- selecting the other of the two channels; and determining whether a detection signal of the other selected channel is set to the reference voltage or not;
- focusing for long distance, when count values corresponding to the detection signals of the two channels are both above a predetermined lower limit term, by stopping the focusing in case of the count value's being above a prescribed upper limit term and feeding back to the selecting step of one channel after focusing to infinite distance in case of the count value's being below the upper limit term;
- focusing for a proximate distance, when the counter values corresponding to the detection signals of the two channels are both below the lower limit term and the two count values are not equal to each other, by rotating motor to proximate distance and feeding back to the selecting step of one channel when said counter values' are above the upper limit term; and
- controlling the light emitting part and direction and speed of focusing when the counter values of the two channels are below the lower limit term and equal to each other.

BRIEF DESCRIPTION OF THE DRAWINGS

The above objects and other advantages of the present invention will become more apparent by describing the preferred embodiment of the present invention with reference to the attached drawings, in which:

FIG. 10A is a schematic view showing the relationship between the power of the infrared LED drier and the count value of the microcomputer;

FIG. 10B is a schematic view showing the relationship between the motor controlling signal, and the voltage in a motor driver shown in FIG. 9; and FIGS. 11a thru 11c are flow charts showing the processes for controlling the respective parts of the microcomputer shown in FIG. 4 to drive the infrared LED and an AF motor.

DETAILED DESCRIPTION OF THE INVENTION

Hereinafter, a preferred embodiment of an automatic focusing apparatus of a video camera and the method thereof according to the present invention will be explained in more detail with reference to the attached drawings.

Figure 1:
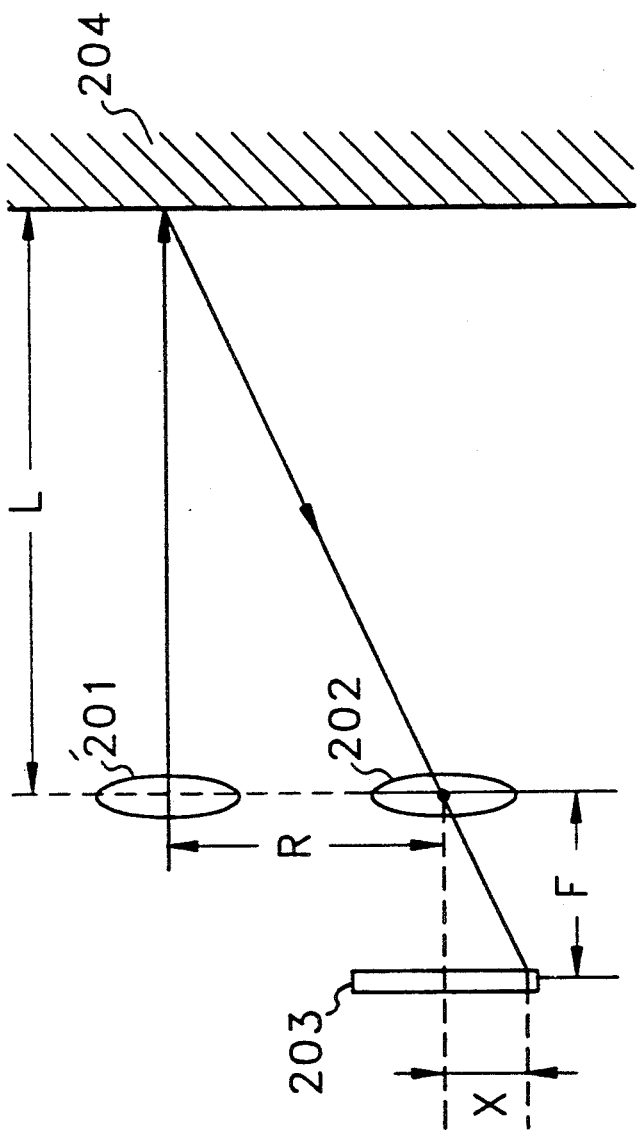
FIG. 1 is a schematic view showing the principle of a conventional active type automatic focusing apparatus.
Figure 2:
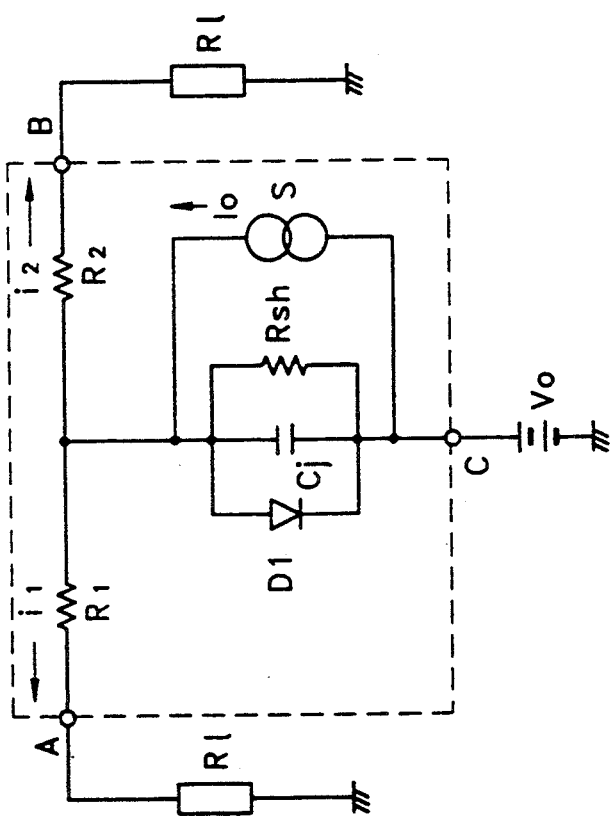
FIG. 2 is an electric equivalent circuit diagram of a conventional light-receiving element.
Figure 3:
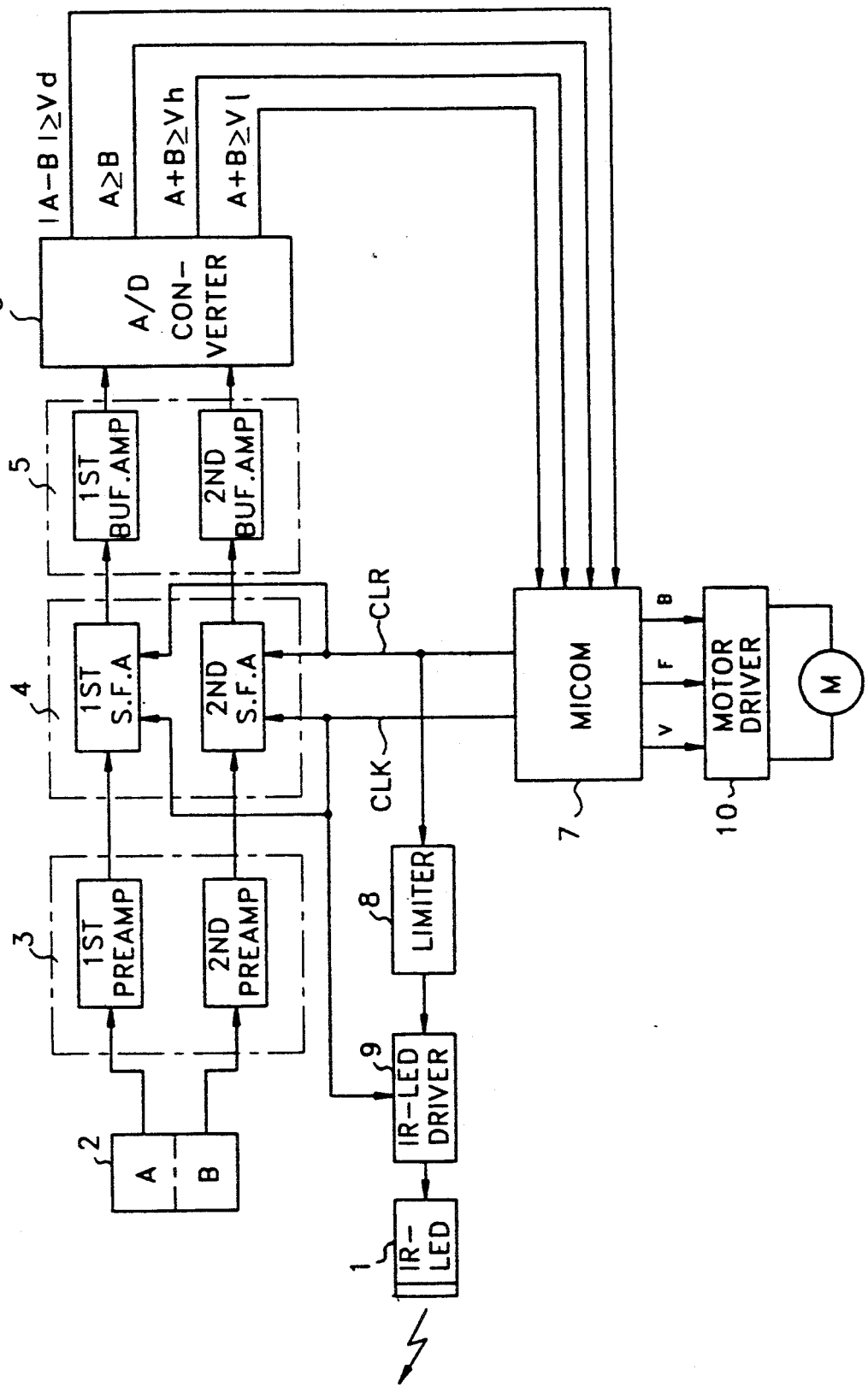
FIG. 3 is a block diagram showing a conventional automatic focusing apparatus for a video camera.
Figure 4:
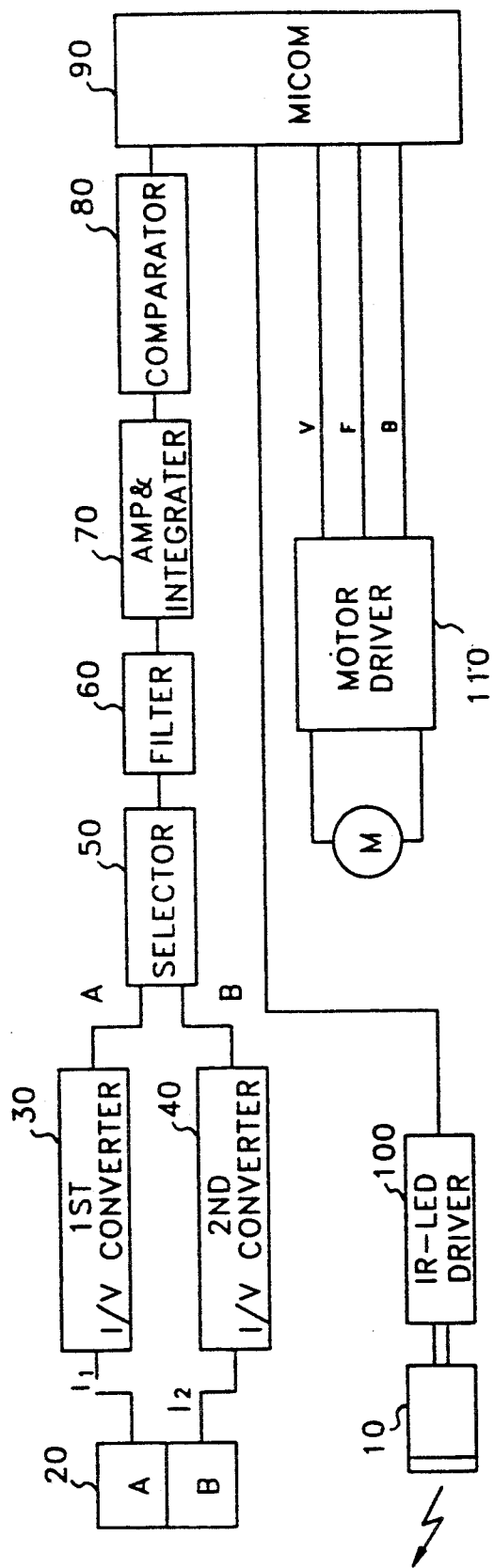
FIG. 4 is a block diagram showing an automatic focusing apparatus for a video camera according to the present invention.

FIG. 4 is a block diagram of an automatic focusing apparatus for a video camera according to the present invention.

Referring to FIG. 4, in a light emitting part 10, infrared rays are generated by using an infrared LED, for example, and are projected through a projecting lens to an object to be photographed. The reflected infrared rays reflected from the object are focused at the light incident position on the light-receiving surface of a light-receiving part 20 through a light-receiving lens.

The light-receiving part 20 consists of split light-receiving elements of two channels A and B and converts the incident light to infinitesimal current signals I1 and I2. The first and second current-voltage converts, hereinafter referred to as I/V converters, 30 and 40 amplify the infinitesimal current signals I1 and I2 produced from the light-receiving part 20 and generate corresponding voltage signals.

The selector 50, of an analog switch, sequentially and alternately selects the output signals of two channels A and B from the first and second I/V converts 30 and 40, and then supplies the selected output signals to the filter 60.

The filter 60 passes only the frequency components within a narrow band including a driving frequency of the infrared LED among the output signals of the channel selected by the selector 50, thereby improving the ratio of signal to noise S/N and then generates amplified signals.

The amplifying integrator 70 again amplifies the amplified and filtered signal in the filter 60 to be converted to the corresponding current signal, and integrates the current signal to a voltage signal linearly increasing as time passes.

A comparator 80 compares the voltage signal supplied from the amplifying integrator 70 with a reference voltage, and outputs a level signal according to the compared result.

In a microcomputer 90, when the output signal of the comparator 80 is "low", a charging signal is transmitted to a capacitor of the amplifying integrator 70. And the reference clocks are counted from the start of the driving signal of the infrared LED, until the voltage signal produced in the amplifying integrator 70 reaches the reference voltage, to control the infrared LED driver 100 and the motor driver 110.

The infrared LED driver 100 receives a burst signal of a predetermined frequency from the microcomputer 90, and controls the emitted from the light intensity of the infrared LED, i.e., the power, in a plurality of steps, to make the infrared LED irradiate.

The motor driver 110 receives a speed control signal V and direction control signals F and B according to the signal counted in the counter of the microcomputer 90, and drives the motor M.

Figure 5:
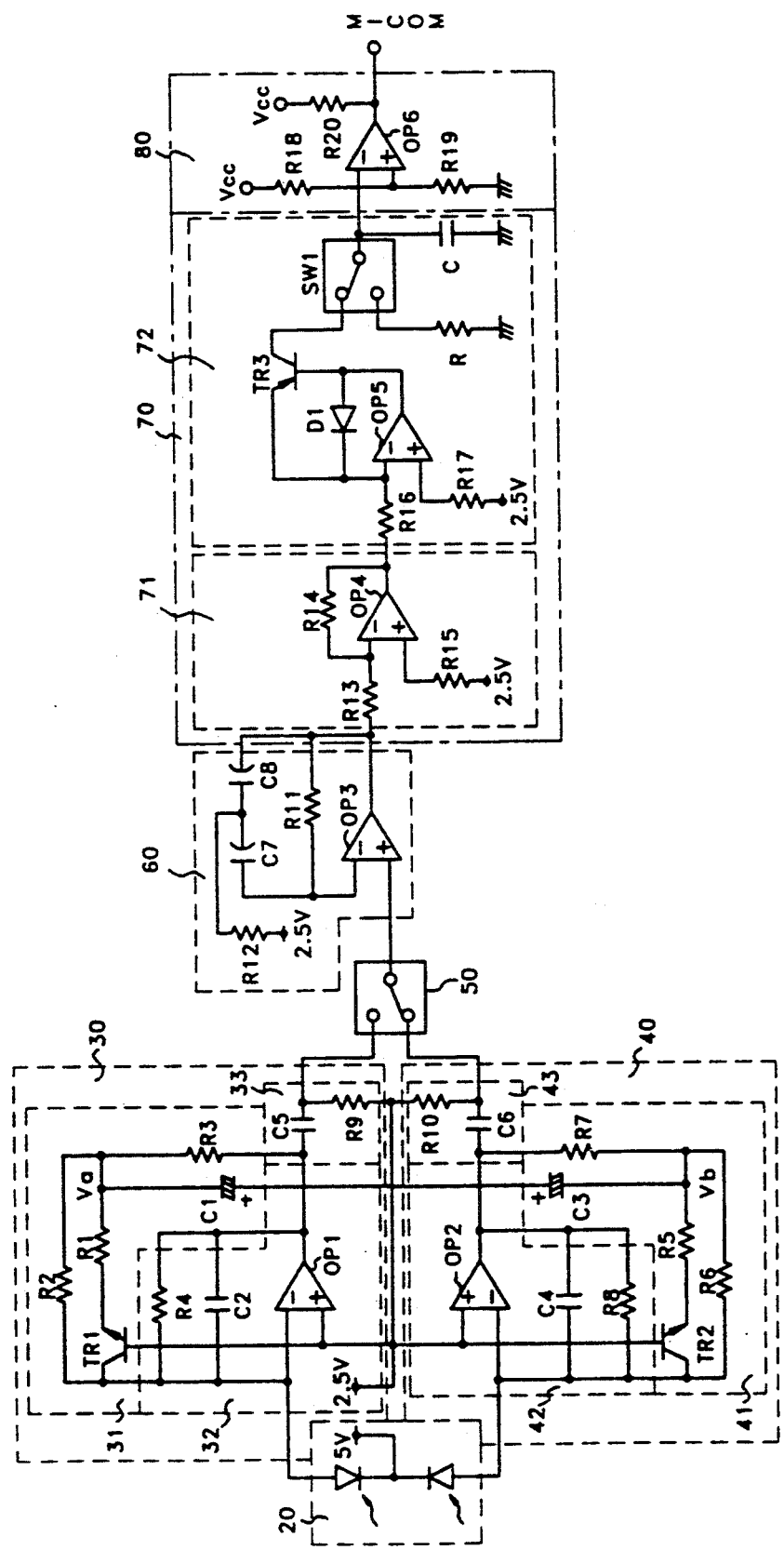
FIG. 5 is a circuit diagram of the automatic focusing apparatus for a video camera shown in FIG. 4, in a preferred embodiment.

FIG. 5 is a detailed circuit diagram of the automatic focusing apparatus of a video camera according to FIG. 4.

In FIG. 5, the light receiving element 20 generates an infinitesimal current proportional to the light intensity irradiated onto channels A and B, and supplies generated currents to the first and the second current-voltage converters 30 and 40 respectively.

However, when the picture is taken at a place where the ambient light is high, a direct current by the ambient light is produced in the light-receiving element 20. Accordingly, the direct current signal supplied to the first and second I/V converters 30 and 40 is also increased, so that the level of the output voltage of the operation amplifier OP1 becomes lower, and the operation amplifier OP1 is saturated and become negative.

Thus, an ambient light removing circuit 31 is provided to minimize the feedback impedance when the direct current flows, and selectively amplifies only the current generated by the burst signal from the microcomputer 90, for instance, by a 10 kHz alternating current signal.

In the ambient light removing circuit 31, when the output voltage Va of the operation amplifier OP1 is lowered to below −0.7 V by increased direct current due to ambient light, a transistor TR1 is turned on to remove excessive current by resistors R3, R4 and a capacitor C2.

When the direct current by the ambient light is removed in the ambient light current removing circuit 31, the output terminal of the operation amplifier OP1 of the firs I/V converter 32 produces an amplified voltage signal, for instance, a signal having a gain of 50 dB. The high-pass filter 33 removes the noise of low frequency below 60 Hz among the output signals supplied from the output terminal of the operation amplifier OP1 by a capacitor C5 and a resistor R9, thereby producing a signal having an improved S/N ratio.

As the constitution and the operation of the second I/V converter 40 is the same as the first I/V converter 30, the corresponding elements are indicated with the reference numerals in which 10 is commonly added to the reference numerals of the elements in the first I/V converter 30, and the repetitive explanation is omitted.

The switch 50 alternately changes the output signals of the first and second I/V converters 30 and 40 with time-division under the control of the microcomputer 90. The output signals of the I/V converters 30 and 40 selected by the switch 50 are filtered in filter 60 to have a driving frequency of the infrared LED 10, for example, a frequency band having 10 kHz signal component only simultaneously amplified where filter 60 comprises an operation amplifier OP3, capacitors C7 and C8 and Resistors R11 and R12. The output signals of the I/V converter 30 and 40 are to have a gain, for instance, of 33 dB, and subsequently output.

Figure 6:
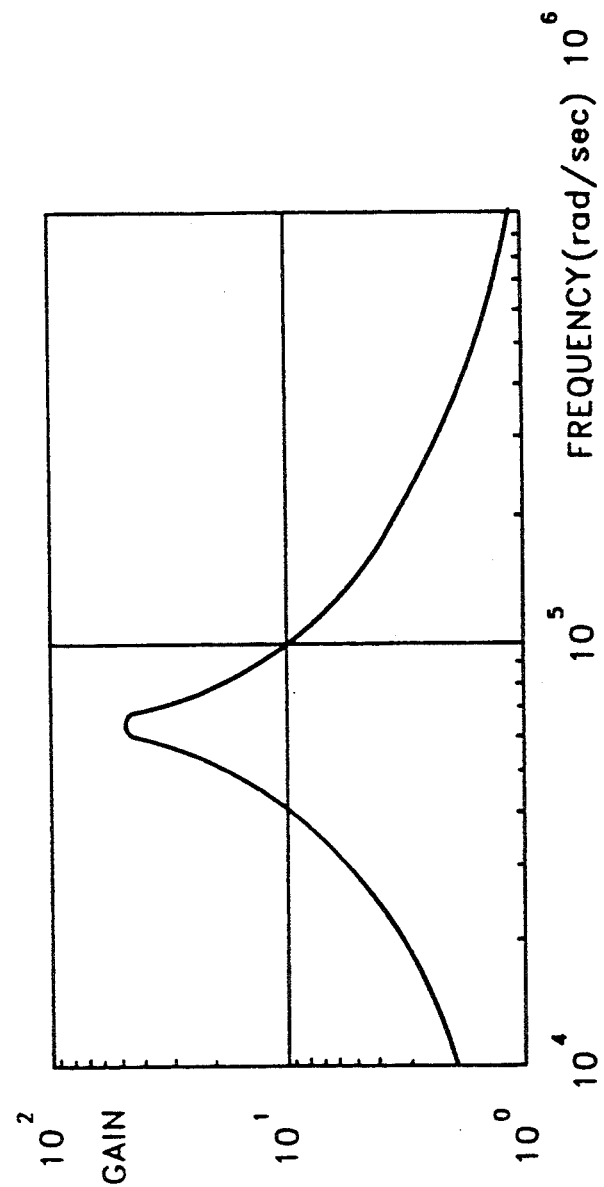
FIG. 6 is a view showing a frequency response characteristic curve of the band-pass filter shown in FIG. 5.

The frequency response characteristic of the filter 37060/ves 60 is shown in FIG. 6, in which the peak value exists near at $2\pi \times 10^4$ rad/sec. In this drawing, fi the driving frequency of the infrared LED, i.e., .10 kHz of a burst signal, is converted into the frequency unit of rad/sec, $2\pi \times 10^4$ rad/sec is obtained, and the gain of 13 dB is obtained at this time.

In the non-inverted amplifying circuit 71 of the amplifying integrator 70, the output signal of the filter 60 is amplified to have a gain, for instance, of 13 dB, by the non-inverted amplifier OP4.

The voltage signal supplied form the output terminal of the non-inverted amplifying circuit 71 will be indicated as Vp. In the integrator 72, when the output voltage signal Vp of the non-inverted amplifying circuit 71 is greater than the reference voltage, for instance, 2.5 V, the current value of Vp/R16 is supplied to the inverted terminal of the operation amplifier OP5, and, accordingly, the output of the operation amplifier OP5 becomes "low", and the transistor TR3 is turned on. Accordingly, the first switch SW1 is connected to the terminal of number 1, and the current value of Vp/R16 is charged in the capacitor C.

Figure 7A:
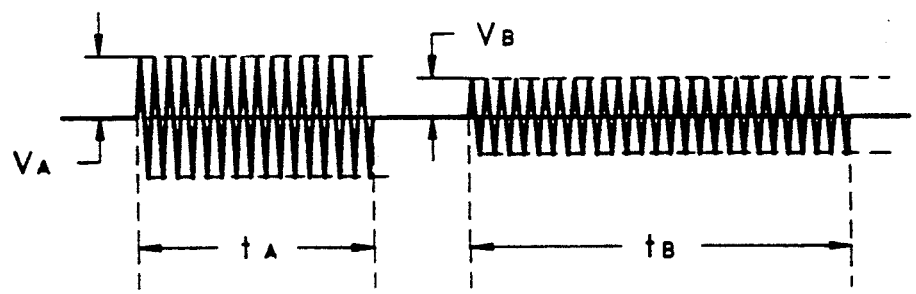
FIG. 7A is a waveforms chart of the signal produced in the non-inverted amplifying circuit of the amplifying integrator shown in FIG. 4.
Figure 7B:
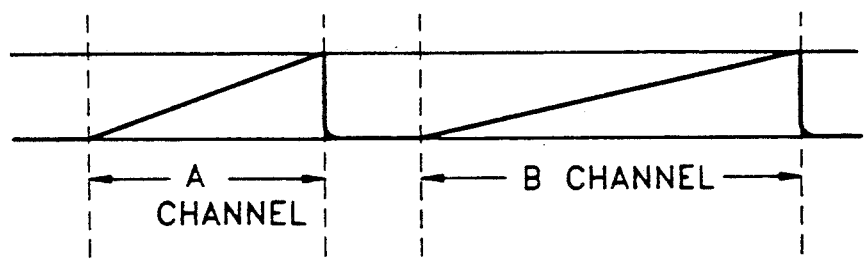
FIG. 7B is a waveforms chart of the signal generated from the integrator of the amplifying integrator shown in FIG. 4.

When the voltage V generated in the output terminal of the non-inverted amplifying circuit 71 is smaller than 2.5 V, the output of the operation amplifier OP5 becomes "high", so that the transistor TR3 is turned off, and the output is clamped through the diode D1. At this time, when the object to be photographed is in a distance farther than the proximate distance, for instance, at 7 m, and the focusing is not correct, the signal amplified and produced in the non-inverted amplifying circuit 71 has a waveform such as that shown in FIG. 7A. And, the signal obtained from the output signal of the non-inverted amplifying circuit 71 by being charged and integrated in the capacitor C of the integrator 72 has a waveform such as that shown in FIG. 7B. Here, when the wave amplitude of the output signal of the non-inverted amplifying circuit 71 is larger, larger currents flow in the capacitor of the integrator 72, thereby more rapidly reaching the reference voltage. Accordingly, the voltage difference of two channels A and B selected alternately by the switch 50 can be converted into the time difference of the integrated signal. That is, a proportional relationship exists in both terms, which is $(Va - Vb) \propto (tb - ta)$. Accordingly, the microcomputer 90 counts the reference clock, and measures the difference of these integration times ta and tb, thereby determining whether the focusing is carried out and determining the control degree.

On the other hand, when the integration voltage integrated by being charged in the capacitor C of the integrator 72 in the comparator 80 is greater than the reference voltage Vcc set in positive terminal of the differential amplifier OP6, the output level of the differential amplifier OP6 is set to "low", and is supplied to the microcomputer 90.

Accordingly, the microcomputer 90 transmits a discharging signal to discharge the charge in the capacitor C through the discharge resistor R, thereby clearing the integrator 72.

Figure 7C:
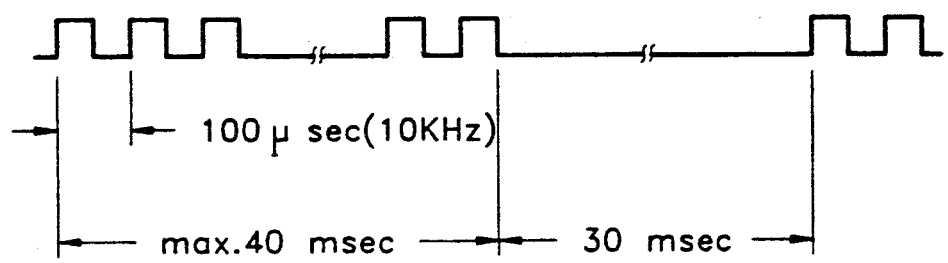
FIG. 7C is a waveform chart of the driving signal for driving the infrared LED in the microcomputer shown in FIG. 4.

FIG. 7C is a waveforms chart of the burst signal, which is 10 kHz driving frequency of infrared LED supplied form the microcomputer 90. For instance, if the period of the burst signal is 100 μsec and the infrared LED is irradiated for 40 msec and the motor is contorlled for 30 msec, the sampling period of the apparatus according to the present invention is 70 msec.

Figure 8:
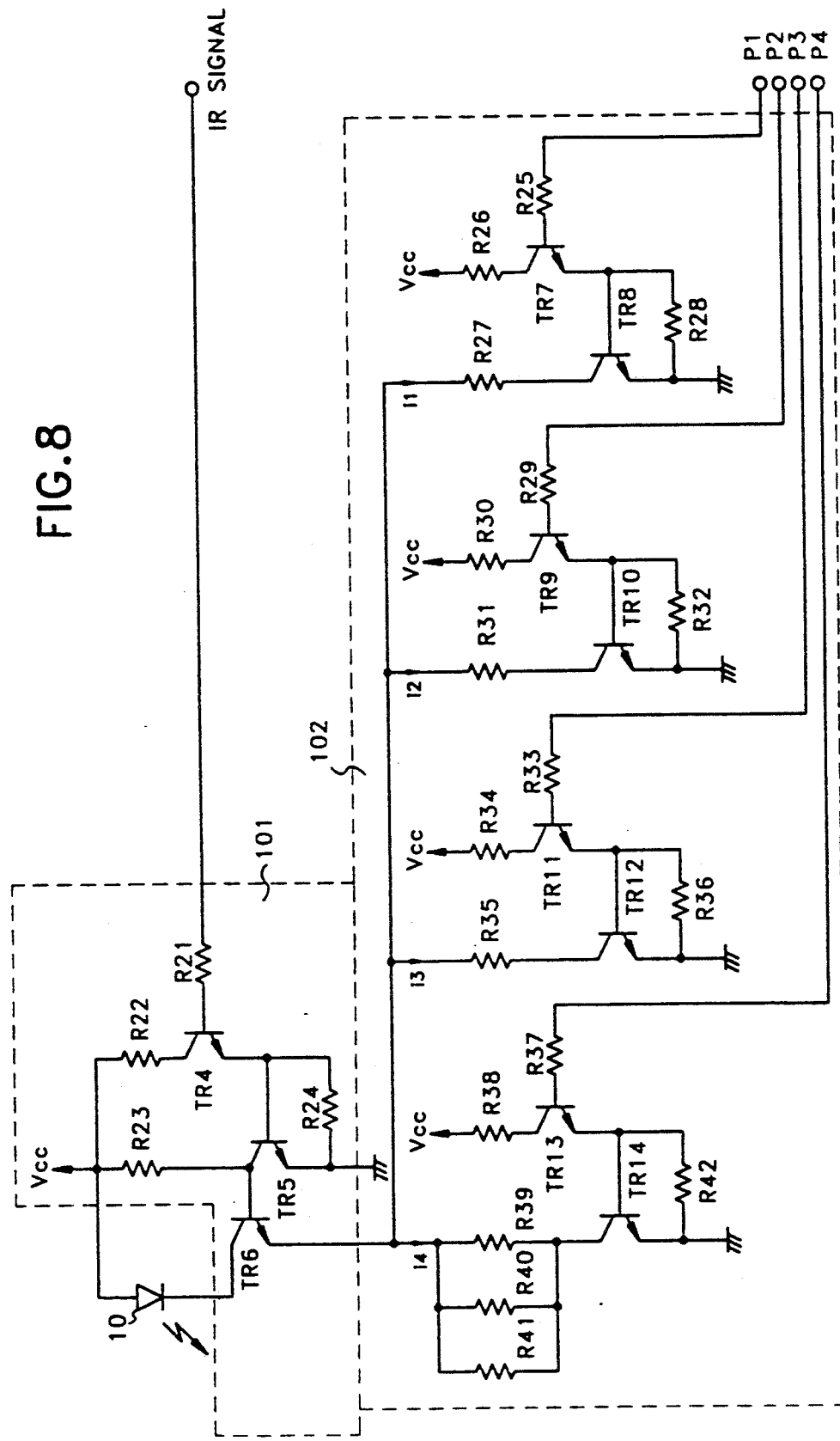
FIG. 8 is a detailed circuit diagram of the infrared LED shown in FIG. 4.

FIG. 8 is a detailed circuit of the infrared LED driver 100 shown in FIG. 4. Referring to FIG. 8, the driving signal supplied from the microcomputer 90, i.e., a 10 kHz burst signal IR is supplied to the transistor TR4 of the infrared LED on/off circuit 101. On the other hand, the microcomputer 90 counts the amplitude of the output signal of both channels A and B set as "low" levels in the comparator 80, and divides the signal into light intensity control signals P1, P2, P3 and P4 of four steps to be supplied to the infrared LED driver 100. In the infrared LED irradiating intensity controlling circuit 102, when a "high" signal is supplied from the microcomputer 90 to the terminal P1, the transistors TR7 and TR8 connected with the darlington connection are turned on, so that the current i1 flows, and the light intensity of the infrared LED 10 is controlled to the intensity corresponding to the current i1, and the infrared LED is irradiated.

When a "high" signal is supplied from the microcomputer 90 to the terminal P2, the transistors TR9 and TR10 connected with the darlington connection are turned on, and the infrared LED 10 is irradiated with the intensity corresponding to the current i1+i2. When a "high" signal is supplied from the microcomputer 90 to the terminal P3, the transistors TR11 and TR12 connected with the darlington connection are turned on and the infrared LED 10 is irradiated with the intensity corresponding to the current i1+i2+i3. When a "high" signal is supplied from the microcomputer 90 to the terminal P4, the transistors TR13 and TR14 connected with the darlington connection are turned on, the infrared LED 10 is irradiated with the light intensity corresponding to the current i1+i2+i3+i4.

FIG. 10A is a schematic view showing the relationship between the light intensity for driving the infrared LED in the driving circuit shown in FIG. 8 and the count value being calculated in the microcomputer. In this drawing, the count value of the microcomputer and the light intensity control signal are respectively indicated in the dimensionless unit. The reason of controlling the light intensity in a plurality of steps is that the reflected light intensity received in the light receiving element is changed according to the kind of the object to be photographed or the distance, so that a compensation is needed to get a signal of constant level. That is, when the microcomputer count value corresponding to the integration time difference between two channel signals becomes larger, the infrared LED should be driven to the large light intensity, and when the reflectivity of the object is low, the infrared LED should be driven to the large light intensity. At this time, since the total gain of the automatic focusing apparatus of the above-mentioned preferred embodiment is about 100 dB, for example, the light intensity of the infrared LED, i.e., the driving voltage, is controlled in four steps to constantly have a dynamic range regardless of the type of the object and its distance.

Figure 9:
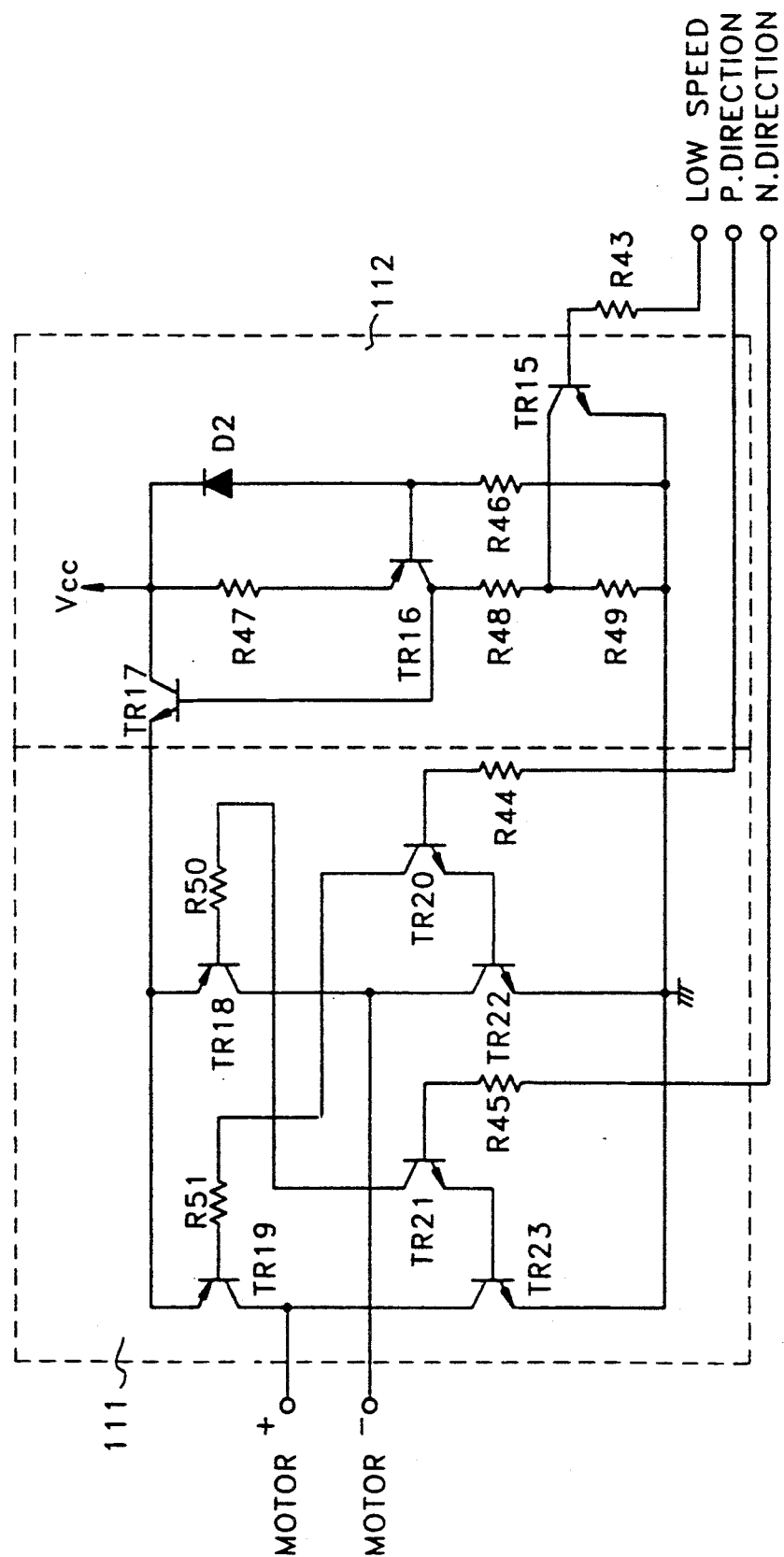
FIG. 9 is a detailed circuit diagram of the motor driver shown FIG. 4.

FIG. 9 is a detailed circuit diagram of the motor driver 110 shown in FIG. 4.

Referring to FIG. 9, the motor driver 110 includes a motor direction control circuit 111 and a motor speed control circuit 112. Here, in the motor direction control circuit 111, the rotation direction of the motor is decided by the signal counted in the microcomputer 90. For instance, when the control signal of the positive direction is supplied as a "high" signal to a positive direction terminal P.DIRECTION in the microcomputer 90, the control signal directs the motor to rotate to the positive direction through transistors TR20, TR22, and TR19.

On the other hand, when a control signal of a negative direction is supplied to a negative direction terminal N.DIRECTION as a "high" signal, the control signal directs the motor to rotate to the negative direction through transistors TR21, TR23, and TR18.

Also, if the signal difference between two channels A and B, i.e., the count value difference, is large, the motor is preferably controlled at a high speed. On the other hand, as a motor has inertia, and hunting is easily generated, the motor should be controlled at a low speed when the signal difference between two channels A and B is small.

Accordingly, if the signal difference between both channels A and B is small, a "high" signal is supplied as a low speed control signal to a low speed terminal LOW SPEED of the motor speed control circuit 112 from the microcomputer 90, so that the transistor TR15 is turned on and the motor is rotated at a low speed to avoid hunting.

In the motor direction and speed control, the control is carried out by a pulse width modulated (PWM) signal from constant voltage fed according to the counter signal in the microcomputer 90. In the control signals indicated with vertical dots in FIG. 10B, the control signals in the further right side have larger pulse widths, so that the driving speed of the motor becomes faster.

Figure 11A:
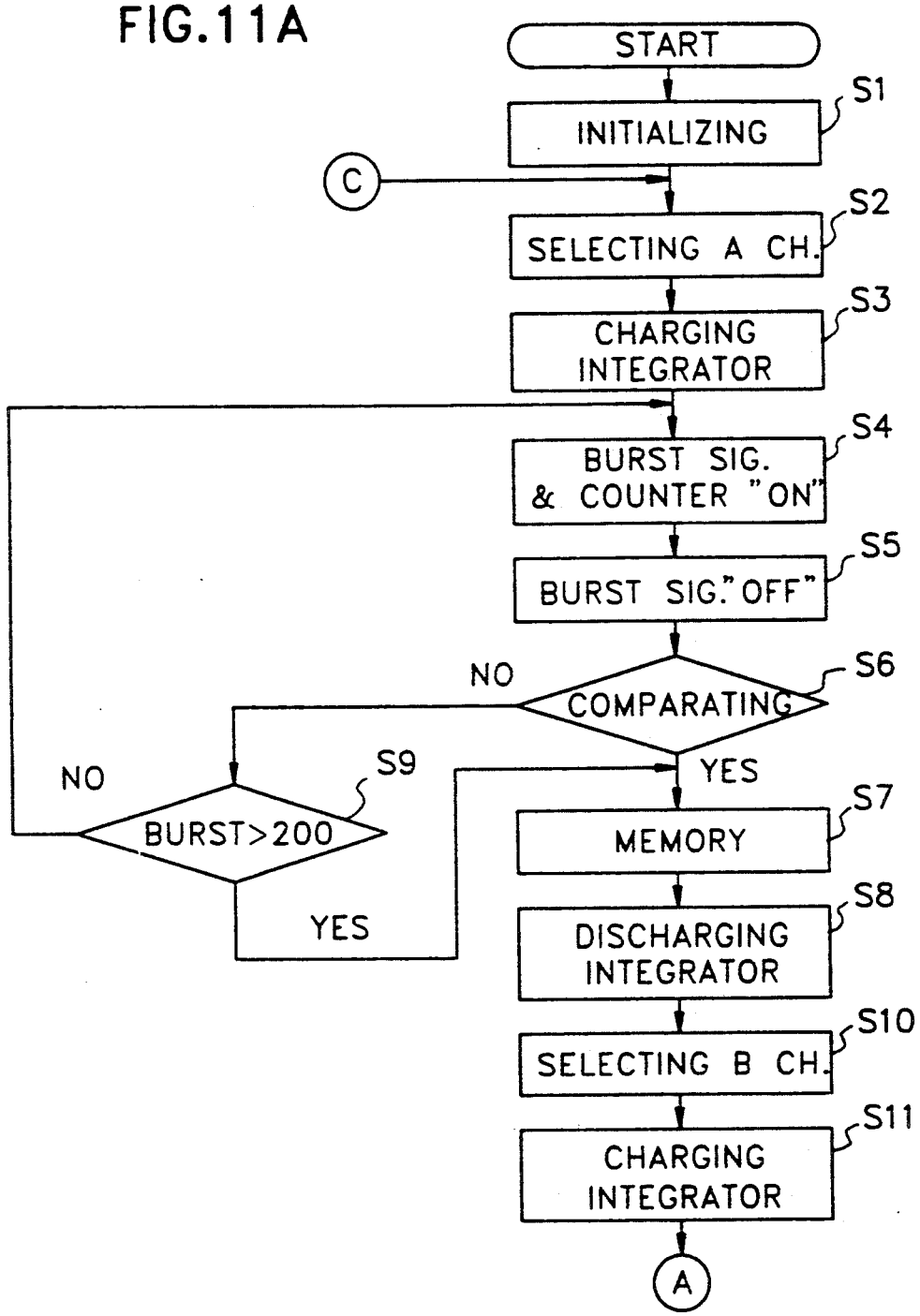
Figure 11C:
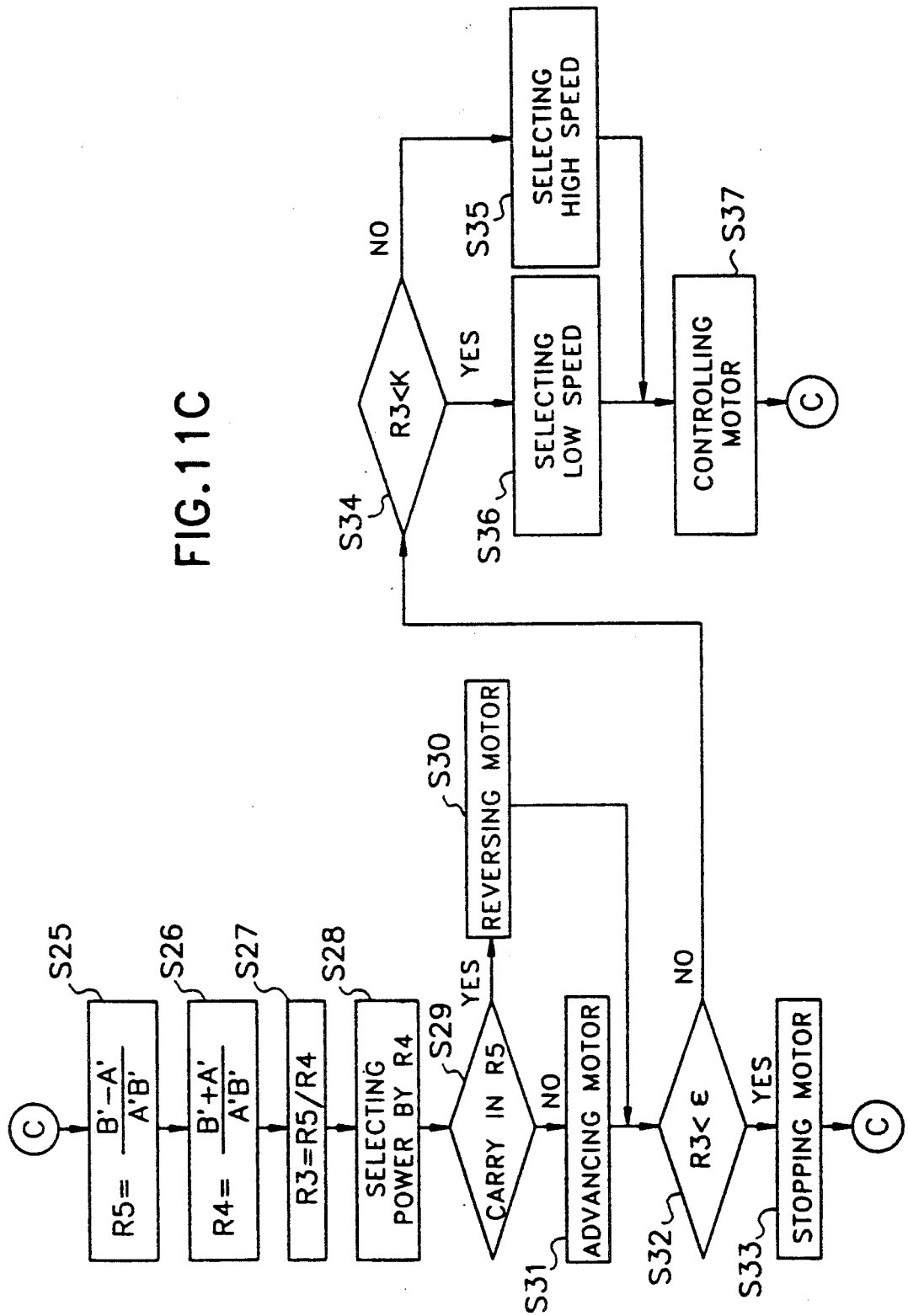

FIGS. 11A to 11C are flow charts showing the processes in which each part is controlled in the microcomputer shown in FIG. 4, to drive in the infrared LED and AF motor, and will be explained with reference to FIGS. 4 to 8.

In a step S1, after the microcomputer 90 is initialized to clear the memory and counters, a capacitor C of the integrator 72 is discharged for 1 msec, and a light intensity control signal P4 is first selected for a maximum power.

In steps S2 and S3, after the infinitesimal current signals I1 and I2 produced in the light-receiving element 20 are converted to voltage signals in the first and the second I/V converts 30 and 40, a control signal is supplied to the switch 50 to select the channel A (in the step S2), and the signal transmitted to the channel A is charged and integrated in the amplifying integrator 70 via the filter 60 (in the step S3).

In steps S4 and S5, the 10 kHz burst signal for driving the infrared LED is turned on, for instance, for 50 μsec and at the same time the counter is turned on (in the step S4), and the burst signal is turned off for 50 μsec, thereby producing a driving signal of the infrared LED having a period of 100 μsec (in the step S5).

In the steps S6 to S8, the microcomputer determines whether the integration signal of the channel A transmitted to the comparator 80 is set to a reference voltage or not (in the step S6). If the signal is set, the number of burst signals is stored in the counter from the start of driving the infrared LED until the signal of the channel A is set (in the step S7), and a clear signal for discharging the capacitor C of the integrator 72 is produced (in the step S8).

In a step S9, if the signal of the channel A is not set in the step S6, the microcomputer checks whether the number of the counted burst signal is larger than 200 or not. If the number is larger than 200, the step S7 is carried out, and if not, the procedure is fed-back to the step S4. Here, the burst signal count number 200 corresponds to the value of 20 msec, which is the bottom limit value for the case of object's being at the proximate distance or stopping of integration by noise.

In steps S10 to S11, a control signal is sent to the switch to select the channel B (in the step S10), and the signal transmitted through the channel B is charged in the capacitor C of the integrator 72 to be integrated (in the step S11).

In steps S12 and S13, after the 10 kHz burst signal for driving the infrared LED is turned on for 50 μsec and the counter is turned on (in the step S12), the burst signal is turned off for 50 μsec, thereby producing the driving signal of the infrared LED having a period of 100 μsec (in the step S13).

In steps S14 and S16, it is determined whether the integration signal of the channel B, transmitted to the comparator 80 is set to a reference voltage or not (in the step S14), and if the signal is set, the number of burst signals is stored in the counter from the start of driving the infrared LED until the signal of the channel B is set (in the step S15), and a clear signal for discharging the capacitor C of the integrator 72 is produced (in the step S16).

In a step S17, if the integration signal of the channel B, transmitted to the comparator 80 is not set, it is determined whether the number of the burst signals is larger than 200 or not, and if it is larger than 200, the step S15 is carried out, and if not, the procedure is fed-back to the step S12.

In steps S18 to S21, it is determined whether each of the count values of the channels A and B is above the lower limit term, i.e. above 20 msec (in the step S18), and if it is above 20 msec, it is discriminated whether the count value is above 10 sec or not (in the step S19), and if it is above 10 sec, the photographing lens is considered to be moved to an infinite position, the motor is stopped (in the step S20), and, if not, and the motor is rotated to the infinity direction to be fed-back to the step S2 (in the step S21).

In the steps S22 to S24, if the count values of the channels A and B in the step S18 are below 20 msec respectively, it is determined whether the count values of the channels A and B are equal to each other or not (in the step S22). If they are not equal, it is again determined whether the count value is above 10 sec or not (in the step S23). If it is above 10 sec, the photographing lens is considered to be moved to a proximate position, and the motor is stopped (in the step S24). If the count value is below 10 sec, the motor is rotated to the proximate direction and then the procedure is fed-back to the step S2 (in the step S24).

In steps S25 to S28, when the count values A' and B' of the channels A and B in the step S22 are almost equal to each other, i.e., when the amplitudes of the position detecting signals of the channels A and B are almost equal to each other, the amplitudes of the signals transmitted to channels are proportional to the inverse numbers of the count values A' and B'. Accordingly, the amplitude difference is equal to the ratio of $(B'-A')/(A'B')$ which is the ratio of the difference to the produce of the count values, and this value is stored in the register R5 (in the step S25). And the sum of the amplitudes corresponds to the ratio of $(B'+A')/A'B'$, which is the ratio of the sum to the product of the count values, is stored in the register R4 (in the step S26). The ratio of the value stored in the register R5 to the value stored in the register R4, i.e., the ratio of $(B'-A')/(B'+A')$, which is the ratio of the difference and the sum of the count values is stored in the register R3 (in the step S27), and the power of the infrared LED is selected according to the stored value in the register R4 (in the step S28).

As shown in the FIG. 10A, the farther the object whose distance is measured is, the larger the count value is, and accordingly the required light-irradiation intensity, i.e., the power, of the infrared LED is increased. Therefore, in the present invention, the light emitting intensity of the infrared LED is divided and controlled in four steps according to the count value, and the leading and trailing edges of each step are overlapped to each other whenever the step is changed in order to stabilize the system. This overlapped portion corresponds to a hysteresis band.

In steps S29 to S31, it is checked whether the order change, i.e., a carry, of the stored value in the register R5 is generated or not (in step S29), and if the carry is generated, the motor is moved to the negative direction (in the step S20, and if not, the motor is moved to the positive direction (in the step S31).

In steps S32 and S33, the ration of (B'−A')/(B'+A'), which is the ratio of the difference and the sum of the counter values stored in the register R3 is compared with a predetermined error value $\epsilon$ representing the hysteresis band (in the step S32), and when it is below the error value, the motor is stopped, the automatic focusing is completed, and fed back to the step S2 (in the step S33). At this time, the error value $\epsilon$ is set to a value below 5% of the stored value in R3, for instance.

In steps S34 to S37, when the value stored in the register R3 from the step S32 is above the error value $\epsilon$, it is determined whether the value stored int he register R3 is above a set value K for the low speed driving (in the step S34), and if the value is above the set value K, the motor M is controlled to rotate at a high speed by a pulse width modulation PWM (in the steps S35 and S37), and if the value is below the set value K, the focusing is carried out by controlling the motor to rotate at a low speed and then fed back to the step S2 (in the steps S36 and S37). At this time, the set value K is set to the value of 20% of the stored value in the register R3, for instance.

As described above, according to the present invention, the infinitesimal currents of two channels generated from the light-receiving part is processed by one channel, thereby simplifying the constitution. Moreover, the control signal for driving the infrared LED and AF motor is processed with software in a microcomputer, so that the difficulty of keeping low bias current and the small offset voltage characteristic required with hardware is solved and the reliability and the stabilization of the system are increased.

What is claimed is:

1. An automatic focusing apparatus for a video camera comprising:
    a light emitting device for emitting a light beam to measure a distance;
    a driver for driving said light emitting device;
    a light receiving device composed of two channels, for producing photocurrent signals respectively corresponding to the two channels according to an incident point of reflected light projected from said light emitting part and reflected by an object;
    first and second current-voltage converting means for converting each of the photocurrent signals of the two channels to an amplified voltage signal;
    a selector for selecting output signals of said first and second current-voltage converts by time-division;
    a filter for filtering said selected output signal;
    an amplifying integrator for amplifying and integrating output signals of said filter;
    means for comparing an integrated voltage signal with a set voltage, and for generating a level signal according to the comparison;
    a motor driver for driving a focus controlling motor; and
    a microcomputer for sequentially receiving level signals from said means for comparing corresponding to said two channels, comparing the difference, and driving said motor driver according to the difference of said two level signals until said two level signals are equal to each other.

2. An automatic focusing apparatus for a video camera as claimed in claim 1, wherein each of said first and second current-voltage converting means comprises:
    first and second ambient light current removing circuits for removing the effect of an ambient light;
    first and second current-voltage converts for converting the photocurrent signal generated from said light-receiving part to a voltage signal; and
    a high-pass filter for removing noises of signals supplied from said first and second current-voltage converters.

3. An automatic focusing apparatus for a video camera as claimed in claim 2, wherein each of said first and second ambient light current removing circuits comprises:
    transistors which are turned on when direct current generated by ambient light is supplied to each collector terminal; and
    resistors and capacitors, for removing said direct currents when said transistors are turned on.

4. An automatic focusing apparatus for a video camera as claimed in claim 1, wherein said selector receives control signals from said microcomputer and sequentially selects the output signals of said two channels responsive to the control signals for a predetermined sampling period.

5. An automatic focusing apparatus for a video camera as claimed in claim 4, wherein said selector consists of an analog switch.

6. An automatic focusing apparatus for a video camera as claimed in claim 2, wherein said filter filters and amplifies only signal components of a predetermined frequency selected from among filtered signals of said first and second current-voltage converts.

7. An automatic focusing apparatus for a video camera as claimed in claim 1, wherein said amplifying integrator comprises:
    a con-inverted amplifying circuit for amplifying the filtered signals in said filter; and
    an integrator for integrating an input signal when the signal supplied from said non-inverted amplifying circuit is greater than a predetermined reference voltage, and for clamping an input signal when an output signal of said non-inverted amplifying circuit is smaller than the reference voltage.

8. An automatic focusing apparatus for a video camera as claimed in claim 1, wherein said means for comparing an integrated voltage signal comprises a comparator.

9. An automatic focusing apparatus for a video camera as claimed in claim 1, wherein said microcomputer produces:
    a burst signal for driving said light emitting part;
    a control signal for said amplifying integrator which is determined according to the level signal supplied from said means for comparing; and
    control signals for said diver and said motor driver generated by converting detection signals of the incident point of the reflected light on the two channels into count values.

10. An automatic focusing apparatus for a video camera as claimed in claim 1, wherein said driver comprises:

an infrared LED on/off circuit for turning on/off said light emitting device according to a burst signal of a predetermined frequency supplied from said microcomputer;

an infrared LED irradiation intensity control circuit for controlling the light intensity of said light emitting device according to a control signal generated by said microcomputer.

11. An automatic focusing apparatus for a video camera as claimed in claim 10, wherein the control signal of said microcomputer controls said infrared LED irradiation intensity control circuit so that infrared light is emitted from said light emitting device in power levels of four steps.

12. An automatic focusing apparatus for a video camera as claimed in claim 1, wherein said driver receives control signals from said microcomputer, then controls said light emitting part in levels of predetermined steps.

13. An automatic focusing apparatus for a video camera as claimed in claim 1, wherein said motor driver comprises:

a motor direction control circuit for controlling a rotation direction of said motor; and a motor speed control circuit for controlling a rotation speed of said motor.

14. An automatic focusing apparatus for a video camera as claimed in claim 13, wherein said motor direction control circuit comprises a plurality of transistors and resistors having an H bridge structure, thereby controlling the rotation direction of said motor according to control signals supplied from said microcomputer.

15. An automatic focusing apparatus for a video camera as claimed in claim 13, wherein said motor speed control circuit comprises a plurality of transistors, resistors, and a diode, thereby maintaining the speed of said motor at a low speed when a low speed control signal of said microcomputer is supplied to a low speed terminal.

16. An automatic focusing apparatus for a video camera as claimed in any claim 15, wherein said control signal supplied from said microcomputer is a pulse width modulated signal.

17. An automatic focusing apparatus for a video camera as claimed in claim 2, wherein said filter includes an operation amplifier and a high pass filter consisting of resistors and capacitors.

18. An automatic focusing apparatus for a video camera as claimed in claim 14, wherein said control signal supplied from said microcomputer is a pulse width modulated signal.

19. An automatic focusing method for a video camera comprising the steps of:

projecting an infrared light to an object whose distance is to be measured by an infrared LED;

receiving a reflected light reflected from said object, and generating photocurrent signals corresponding to the received light with two channels;

converting said photocurrent signals to amplified voltage signals;

sequentially selecting signals supplied from said current-voltage converting step;

filtering selected signals from said selecting step;

amplifying signals supplied from said filtering step, and converting the amplified signals into corresponding integrated voltage signals;

comparing signals fed from said amplifying and integrating step with a predetermined reference voltage to produce a level signal according to the compared result;

generating control signals for the infrared LED and a lens motor by converting integrated signals from said integrating step into count values according to the level signal from said comparing step;

driving said infrared LED according to one of the control signals so that the infrared LED emits light which has an intensity that varies in steps according to the count value; and driving said motor according to said control signal to focus the camera.

20. An automatic focusing method for a video camera as claimed in claim 18, wherein said motor driving step controls rotation direction and speed of said motor by a pulse width modulated signal according to said count value.

21. A method for automatically focusing a camera using a light emitting device for emitting a measuring light beam and a light-receiving device having two channels for detecting light reflected from an object to be viewed comprising the steps of:

selecting a first voltage signal from a first channel of the light-receiving device;

generating a burst signal having a predetermined frequency;

comparing the first voltage signal to a reference voltage signal;

counting a number of bursts which occur between the generation of the burst signal and a point where the reference voltage is equal to the first voltage, the counted number of bursts being defined as a first count value;

selecting a second voltage signal from a second channel of the light-receiving device;

comparing the second voltage signal to a reference voltage signal;

counting a number of bursts which occur between the generation of the burst signal and a point where the reference voltage is equal to the second voltage, the counted number of bursts being defined as a second count value;

focusing the camera for an object disposed at an infinite distance when the first and second count values are between a predetermined lower limit and a predetermined upper limit;

focusing the camera for an object disposed at a proximate distance when the first and second count values below the predetermined lower limit and are unequal; and controlling direction and speed of focusing when the first and second count values are below the lower limit and equal to each other.

22. An automatic focusing apparatus for a camera comprising:

light-emitting means for emitting light pulses directed to an object for measuring a distance to the object;

light-receiving means, composed of first and second channels, for receiving light reflected from the object and for producing first and second photocurrent signals corresponding to said first and second channels respectively;

light-emitting driving means for controlling the intensity of light emitted from said light-emitting means to compensate for variation in light quantity reflected by the object and input to said light-receiving means due to distance between said light-emitting means and the object and due to reflective characteristics of the object;

current-voltage converting means for converting the first and second photocurrent signals into first and second amplified voltage signals, and for removing excessive current generated by ambient light from the first and second photocurrent signals;

selecting means for selecting one of the first and second voltage signals by time-division;

a band pass filter which transmits a signal having a frequency corresponding to a light pulse emitted by said light-emitting means;

integrating means for amplifying the output of said band pass filter and integrating the first and second voltage signals;

means for comparing said first and second integrated voltage signals with a predetermined reference voltage, and for generating a level signal according to the result;

a focusing motor;

a microcomputer which generates a signal to discontinue the integration operation when the integrated voltage is equal to the predetermined reference voltage, which generates a signal to run said focusing motor until the first and second amplified voltages are equal to the predetermined voltage, and which generates a signals to control the intensity of light emitted from the light-emitting means based on a sum of integration times of the first and second amplified voltages; and motor driving means for controlling motor speed according to a difference in integration times of the first and second amplified voltages.

23. An automatic focusing apparatus for a video camera as claimed in claim 22 wherein each of the first and second current-voltage converting means comprises:

a current-voltage converter for converting a photocurrent signal generated from said light receiving means into a voltage signal;

a high-pass filter for removing noise from signals supplied from said current-voltage converter; and an ambient light current-removing circuit comprising a transistor connected between input and output terminals of said current-voltage converter which is turned on when direct current due to ambient light is supplied to each collector terminal, a capacitor and resistors connected to the transistor such that when the current is increased by the ambient light, the transistor is turned on so as to minimize a feedback impedance of said current-voltage converter due to eh capacitor and resistors.

24. An automatic focusing apparatus for a camera as claimed in claim 22 wherein said selecting means consists of an analog switch which receives control signals from said microcomputer and sequentially selects the output signals of the first and second channels for a predetermined sampling period.

25. An automatic focusing apparatus for a camera as claimed in claim 22 wherein said band pass filter comprises a high-pass filter for filtering and amplifying a frequency component of a light pulse emitted from said light-emitting means.

26. An automatic focusing apparatus for a camera as claimed in claim 22 wherein said integrating means comprises:

a non-inverting amplifying circuit for amplifying the filtered signals form said filter;

an integrator for integrating an input signal when the signal supplied from said non-inverting amplifying circuit is greater than the predetermined reference voltage, and for clamping an input signal when an output signal of said non-inverting amplifying circuit is smaller than the predetermined reference.

27. An automatic focusing apparatus for a camera as claimed in claim 22 wherein said means for comparing comprises a comparator which outputs a ground potential when the integrated voltage of said integrating means is above the predetermined reference voltage.

28. An automatic focusing apparatus for a video camera as claimed in claim 22 wherein said microcomputer produces:

a burst signal with a predetermined frequency for driving said light-emitting means;

a first control signal for controlling said light-emitting means to regulate intensity of emitted light;

a switching signal for controlling discharge of said integrating means according to the level of a signal output from said means for comparing which establishes that the integrated voltage is above the predetermined voltage;

a second control signal for controlling the direction of said motor according to the integration times of the first and second photocurrent signals; and a pulse-width modulated signal for regulating the speed of said motor according to the integration times of the first and second photocurrent signals.

29. An automatic focusing apparatus for a camera as claimed in claim 28 wherein said light-emitting driving means comprises:

an on/off circuit which turns said light-emitting means on and off according to the burst signal supplied from said microcomputer; and an irradiation intensity control circuit which adjusts the intensity of light emitted from said light-emitting means according to the amount of light reflected from an object.

30. An automatic focusing apparatus for a camera as claimed in claim 28 wherein said light-emitting driving means controls light intensity in power levels of four steps.

31. An automatic focusing apparatus for a camera as claimed in claim 22 wherein said motor driving means comprises:

a motor direction control circuit comprising a plurality of transistors and resistors having an H-bridge structure, which control the direction of said focusing motor to be positive or negative according to a direction control signal for said focusing motor which is determined by the difference of the integration times of the first and second photocurrent signals output from said microcomputer; and a motor speed control circuit for controlling the speed of the motor based on a ratio of the difference between the integration times for the firs and second photocurrent signals and the sum of the integration times of the first and second photocurrent signal, wherein the motor is driven at a high speed when the ratio is above both a first and a second set value and the motor is driven at a low speed when the ratio is above the first set value and below the second set value so as to control said motor until the ratio is below the first set value.

32. An automatic focusing apparatus for a video camera as claimed in claim 22 wherein said microcomputer controls said motor driving means so that said focusing motor is rotated to an infinite position when the integration time of both the first and second amplified voltage signals are above a predetermined lower limit term and below a predetermined upper limit term, and to be at a proximate position when the integration time of both the first and second amplified voltage signals are below the lower limit term and above the upper limit term.

33. An automatic focusing method for a camera using a light emitting device for emitting measuring light pulses and a light-receiving device having two channels for detecting light reflected from an object to be viewed comprising the steps of:

selecting a voltage signal from a first channel of the light-receiving device;

integrating the selected voltage signal;

detecting the integration time by counting the time until one of the selected voltage signals equals a predetermined reference voltage;

focusing for infinite distance when the tie count of the voltage signals of both of the channels are above a predetermined lower limit;

stopping said infinite distance focusing when the time count is above a predetermined upper limit;

focusing for proximate distance when the time count of the voltage signals of both of the channels are below a predetermined lower limit and unequal.

34. An automatic focusing method for a video camera as claimed in claim 33 further comprising the steps of:

controlling the intensity of the light pulses for focus measuring using the sum of the time count of each of the voltage signals;

driving a focusing motor in a positive or negative direction depending on whether or not a carry is generated from the ratio of the difference of the time counts of the first and second voltage signals and the product of the time counts of the first and second voltage signals;

driving the motor at a low speed when the count time from the first and second voltages are above a lower limit and below an upper limit; and driving the motor at a high speed when the count times of the first and second voltages are both above the upper limit.

35. An automatic focusing method for a video camera comprising the steps of:

(a) emitting light pulses directed to a fixed object to measure a distance to the object;

(b) receiving first and second photocurrent signals corresponding to two channels respectively, generated by light reflected from the fixed object;

(c) controlling the intensity of the light emitted in said light-emitting step to compensate for variations in light quantity reflected by the object and to compensate for the object distance;

(d) converting the photocurrent signals of the two channels into first and second amplified voltage signals, and removing excessive current due to ambient light;

(e) selecting one of the first and second amplified voltages by time-division and transmitting the selected voltage on a common channel;

(f) filtering the selected signal and transmitting only a portion of the selected signal having a frequency corresponding to a frequency of the light pulses emitted by said light-emitting step;

(g) integrating the filtered signal;

(h) comparing the integrated voltage signal with a predetermined reference voltage, and generating a level signal according to the compared result;

(i) controlling the integrating operation until the integrated voltage of said integrating step is set to the predetermined reference voltage;

(j) controlling a focusing motor until the integration times of the integrated signals coincide; and (k) controlling the speed of the focusing motor according to the difference of the integration times of the integrated signals.

36. An automatic focusing method for a camera as claimed in claim 35 wherein light intensity is controlled in power levels of four steps.

37. An automatic focusing method for a camera as claimed in claim 35 further comprising the steps of:

controlling the direction of the focusing motor to be positive or negative according to a direction control signal which is determined by the difference of the integration times of the integrated signals.

38. An automatic focusing method for a video camera as claimed in claim 35 further comprising the steps of:

driving said focusing motor to an infinite position when the integration times of the integrated signals are above a lower limit and below an upper limit; and driving said focusing motor to a proximate position when the integration times of the integrated signals are below a lower limit.

* * * * *

UNITED STATES PATENT AND TRADEMARK OFFICE
CERTIFICATE OF CORRECTION

PATENT NO. : 5,157,435

DATED : October 20, 1992

INVENTOR(S) : Min et al.

It is certified that error appears in the above-identified patent and that said Letters Patent is hereby corrected as shown below:

Claim 1, col. 11, line 57, change "each of" to --one of the--;

Claim 1, col. 11, line 60, change "converts" to --converters--;

Claim 1, col. 11, line 65, delete ",".

Claim 2, col. 12, line 12, change "converts" to --converters--.

Claim 6, col. 12, line 39, change "filtered" to --output--;

Claim 6, col. 12, line 40, change "converts" to --converters--.

Claim 7, col. 12, line 44, change "con-inverted" --non-inverted--.

Claim 9, col. 12, line 63, change "diver" to --driver--.

Claim 16, col. 13, line 39, delete "any".

Claim 23, col. 15, line 49, change "eh" to --the--.

UNITED STATES PATENT AND TRADEMARK OFFICE
CERTIFICATE OF CORRECTION

PATENT NO. : 5,157,435
DATED : October 20, 1992
INVENTOR(S) : Min et al

It is certified that error appears in the above-indentified patent and that said Letters Patent is hereby corrected as shown below:

Claim 31, col. 16, line 54, change "firs" to --first--.

Claim 33, col. 17, line 18, change "tie" to --time--.

Signed and Sealed this

Sixteenth Day of November, 1993

Attest:

BRUCE LEHMAN

Attesting Officer

Commissioner of Patents and Trademarks